April 13, 1937.  A. ANDERSON  2,076,610
INSTRUMENT FOR SURVEYING BORE HOLES
Original Filed March 11, 1927
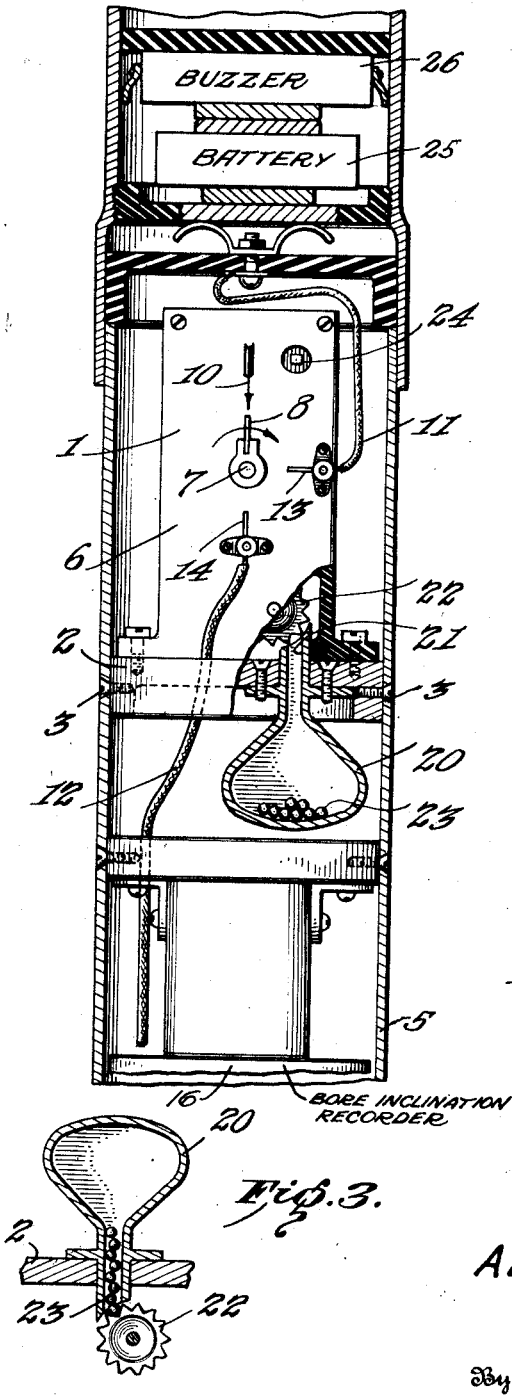
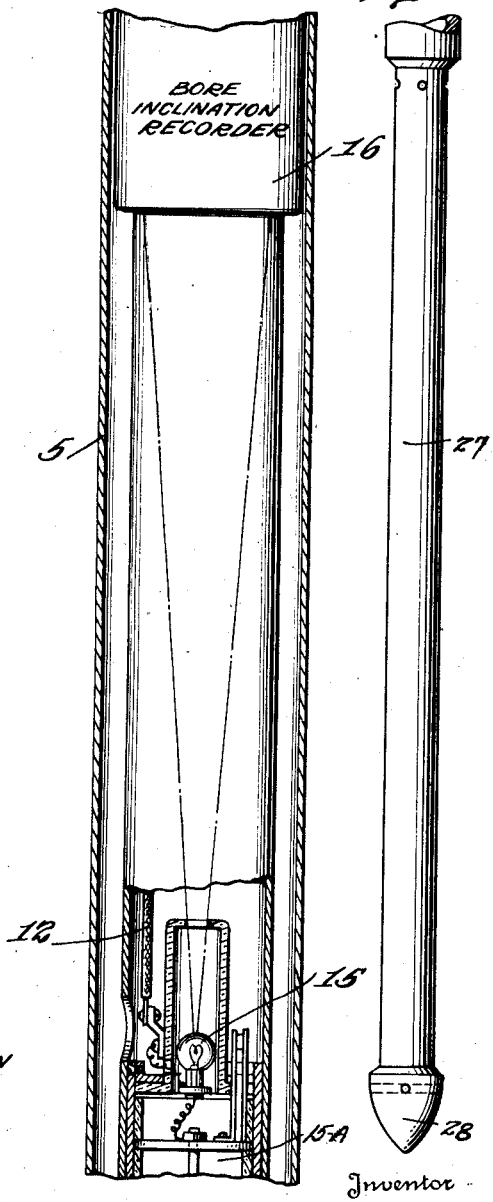
Inventor
ALEXANDER ANDERSON Patented Apr. 13, 1937

2,076,610

UNITED STATES PATENT OFFICE 2,076,610

INSTRUMENT FOR SURVEYING BORE HOLES

Alexander Anderson, Fullerton, Calif.

Original application May 11, 1927, Serial No. 190,641. Divided and this application October 20, 1932, Serial No. 638,790

4 Claims. (Cl. 200—35)

This invention relates to an improvement in instruments for surveying bore-holes, the present application being a division of my prior application, Serial No. 190,641, filed May 11, 1927.

It is an object of this invention to provide a self-contained recording bore-hole survey instrument with an actuating mechanism, and an improved device for initiating operation of this mechanism which device is responsive to the position of the surveying instrument or the movement of the instrument as a whole.

It is also an object of this invention to provide a novel releasable arresting means whereby the actuating mechanism of a bore-hole survey instrument may be held inactive for any desired period of time, and then released for operation by inverting or otherwise changing the position of the instrument.

It is also an object of my invention to provide an improved time-control mechanism for a surveying instrument.

It is a further object of the present invention to provide a simple and positive release for the time-control mechanism of a survey instrument when the position of the survey instrument is changed or the instrument is placed in a borehole.

Other objects and advantages of the invention will be made evident hereinafter.

The accompanying drawing illustrates one form of the invention, Figs. 1 and 2 being longitudinal sectional views of adjacent portions of a survey instrument embodying the invention. Fig. 2 is drawn to a somewhat reduced scale in order to provide a more complete showing within the confines of the drawing. Fig. 3 is a fragmentary view showing the shot container in inverted position. Fig. 4 is an elevational view on a reduced scale of the exterior of the assembled instrument, and shows the water-tight protective casing in which the apparatus is housed.

Referring to the accompanying drawing, the instrument comprises timing means such as a clock movement 1 provided with the usual spring motor and escapement mounted on a circular disk 2 which is secured at 3 to instrument tube 5. The instrument is adapted to be inserted in a bore-hole for the purpose of making a record of the inclination of a portion thereof, for example, and may be sealed in a protective casing 27, closed at its lower end by a rounded nose 28 (see Figure 4). On the face of the clock movement there is a slab of insulating material 6 through which projects a clock shaft 7 rotated by the clock movement in the direction indicated by the arrow. A contact finger 8 is attached to the shaft 7 and grounded to the instrument tube 5 through the shaft and clock frame. An index 10 is engraved on the insulation 6.

The insulated conductors 11 and 12, pertaining to the circuits of a signal or buzzer and of the recording mechanism respectively, are connected to contact fingers 13 and 14 as shown. The time-control mechanism may be of any suitable character. The recording mechanism, for the purposes of illustration, includes an electric lamp 15 in circuit with battery 15a, the contact finger 14 and conductor 12, as shown. The lamp 15 is adapted to cooperate with a recorder 16 to make a record of inclination photographically, as well understood by those skilled in the art, and one form of such a recorder is more fully described in my prior Patent No. 1,801,132.

The conductor 11 extends upwardly within the casing, and is electrically connected to an exposed terminal or electrode of a battery 25, the opposite electrode of which is similarly connected to one terminal of a buzzer or other electrically operated audible signal device 26. The circuit from the buzzer is completed through the wall of the instrument casing, the signal device having a spring contact finger or fingers which extend outwardly into contact with the instrument casing for this purpose.

A flask-like container 20 is suitably secured to the disk 2 with its neck 21 extending through a hole in the disk. The mouth of the container 20 lies in close proximity to the periphery of the wheel 22, which may be any one of the gear wheels or the balance wheel of the clock 1. Preferably, however, the wheel 22 is a wheel on the escapement wheel shaft and therefore has a weak rotational torque. The container 20 contains one or more shot 23. The clock 1 may be wound up with the usual key applied to the arbor 24 of the spring drum.

The operation of the instrument is as follows:

The instrument is maintained in the position shown in Fig. 1, and the clock is allowed to run until the contact finger 8 has rotated to a point exactly opposite the index arrow 10, as shown in Fig. 1. The apparatus is then inverted, thus stopping the clock by causing the shot 23 to enter the tube 21 and rest upon the periphery of the gear 22, as shown in Fig. 3. The instrument is maintained in this inverted position while preparation for making a survey is completed by inserting any necessary supplies, for instance photographic film and dry cells and fully winding the clock by means of a key applied to the arbor 24 of the spring drum, and the insertion and sealing of the apparatus inside its watertight outer casing. As long as the instrument is inverted, i. e., in a position inverse to that shown in Fig. 1, the shot 23 remain in the mouth of the container 20 under the influence of gravity and rest against the periphery of the gear 22 to hold the latter from rotating and accordingly prevent the clock 1 from running. The instrument is thus maintained inoperative until it is inserted in the bore for the purpose of positioning the instrument at the point at which a survey reading is to be made.

To start the operation of the mechanism, the instrument is restored to the position of Fig. 1 when it is placed in the bore-hole. The shot 23 fall back into the container, as shown in the drawing, and away from the gear 22 to release the latter. When the gear wheel is freed, the clock shaft 7 begins to rotate slowly. Each rotation of the clock shaft 7 causes contact between the grounded contact finger 8 and the insulated contact fingers 13 and 14. Before contact is made with the contact finger 13, the instrument may be lowered to the desired position in the bore-hole. With this method of operation the closure of contacts 8 and 13 may be utilized to operate a buzzer or other signal for the operator, and at a definite known time thereafter, the closure of the contacts 8 and 14 completes the circuit of the lamp 15 to flash the latter and thereby effect a record. This mode of operation is given merely as an example. Other ways of using the instrument will be readily apparent to those skilled in the art.

This invention may also be used in conjunction with any form of survey instrument in which a clock controls the operation thereof.

An advantage of the embodiment illustrated is that the driving force of the spring-driven clock is constant and is not subject to variation as a result of the inclination of the apparatus. Furthermore, when the apparatus is operated in a horizontal position, the shot 23 are retained in one side of the container 20, and do not interfere with the running of the clock 1. The engagement of the clock movement by the shot is effected only when the instrument is substantially inverted, but the movement is not again released until the position of the instrument permits the shot to return to the enlarged portion of the container 20.

The contact 13 may be omitted, if desired, as by means of the index 10 the clock may be set, before winding, so that a flashing of the lamp 15 will occur at a predetermined time after the clock is started and by this means the time of flashing is known without any audible signal. When used in conjunction with the audible signal connected to the contact 13, the index 10 serves the useful purpose of indicating to the operator the moment at which the audible signal may be expected to sound. In working with noisy machinery on a derrick floor, this feature is of great assistance to the operator, as he knows when to expect the preliminary signal.

It will be apparent that the release mechanism shown is simple and reliable. Instead of using the shot, many other equivalent forms may also be designed on the same principle, without departing from the spirit of this invention.

Having described my invention, what I claim is:

1. In apparatus for controlling the operation of a bore surveying instrument, the combination comprising, an electrical contact, a clock movement including a driven gear, a movable contact operated by said clock movement for periodically engaging said first mentioned contact, an open mouth container having the mouth thereof positioned in close proximity to said gear, and shot disposed in said container that are adapted to fall into the mouth thereof to engage said gear to stop the clock movement when the said instrument is in a predetermined inoperative position.

2. In apparatus for controlling the operation of an inclination recorder within a bore surveying instrument the combination comprising, time control means for initiating the operation of said recorder, said means including a clock movement having a movable driven part, and a rolling detent arranged to move into engagement with said driven part and operative by such engagement to stop the operation of said clock movement when the instrument is held in a predetermined inoperative position.

3. In apparatus for controlling the operation of a recorder within a bore surveying instrument, the combination comprising, time control means for initiating the operation of said recorder, said means including a clock movement having a movable driven part, and detent means including an element which is free to roll in response to tilting of the instrument and to effect engagement with said driven part that is operative to stop the operation of the clock movement when the instrument is held in a predetermined inoperative position.

4. In apparatus for controlling the operation of a recorder within a bore surveying instrument, the combination comprising, time control means for initiating the operation of said recorder, said means including a clock movement having a movable driven part, and a detent arranged to move translationally into direct engagement with said driven part and operative by such engagement to stop the operation of the clock movement when the instrument is held in a predetermined inoperative position.

ALEXANDER ANDERSON.